(12) United States Patent
Huang

(10) Patent No.: US 10,367,902 B2
(45) Date of Patent: Jul. 30, 2019

(54) MEDIA RESOURCE ADDRESS RESOLUTION AND ACQUISITION METHOD, SYSTEM, SERVER AND CLIENT TERMINAL

(71) Applicant: GUANGZHOU UCWEB COMPUTER TECHNOLOGY CO., LTD., Guangzhou (CN)

(72) Inventor: Mingli Huang, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 150 days.

(21) Appl. No.: 15/217,891

(22) Filed: Jul. 22, 2016

(65) Prior Publication Data

US 2017/0034115 A1 Feb. 2, 2017

(30) Foreign Application Priority Data

Jul. 30, 2015 (CN) .......................... 2015 1 0466511

(51) Int. Cl.
*H04L 29/12* (2006.01)
*H04L 29/08* (2006.01)
(Continued)

(52) U.S. Cl.
CPC ...... *H04L 67/2814* (2013.01); *G06F 16/9535* (2019.01); *G06F 16/9537* (2019.01); *G06F 16/9566* (2019.01); *H04L 67/02* (2013.01)

(58) Field of Classification Search
CPC .................. H04L 67/2814; H04L 67/02; G06F 17/30867; G06F 17/3087; G06F 17/30887
See application file for complete search history.

(56) References Cited

U.S. PATENT DOCUMENTS

| | | | | |
|---|---|---|---|---|
| 7,281,034 B1 * | 10/2007 | Eyal | ................. | H04N 21/26258 709/206 |
| 8,972,880 B2 * | 3/2015 | Lin | ................... | G06F 17/30896 380/279 |

(Continued)

FOREIGN PATENT DOCUMENTS

| | | |
|---|---|---|
| CN | 102510543 A | 6/2012 |
| CN | 102523248 A | 6/2012 |

(Continued)

OTHER PUBLICATIONS

English Translation of CN 103036929.*
(Continued)

*Primary Examiner* — Tu T Nguyen
(74) *Attorney, Agent, or Firm* — Sheppard Mullin Richter & Hampton LLP

(57) ABSTRACT

The present invention provides a media resource address resolution and acquisition method, system, a server and a client terminal, and relates to the field of multimedia technologies, wherein the resolution method includes: sending an assist resolution request to a client terminal, the assist resolution request carrying reference address information of a media resource on a target website, used for directing the client terminal to acquire webpage information of the media resource from the target website according to the reference address information and return the webpage information; and receiving the webpage information of the media resource returned by the client terminal, and resolving the webpage information of the media resource to obtain a playback address of the media resource. Thus, the capability of the client terminal is utilized to assist in acquiring webpage information of a media resource required by address resolution, and the success rate of the address resolution is improved.

17 Claims, 4 Drawing Sheets

(51) Int. Cl.
G06F 16/955 (2019.01)
G06F 16/9537 (2019.01)
G06F 16/9535 (2019.01)

(56) References Cited

U.S. PATENT DOCUMENTS

2013/0103660 A1* 4/2013 Welsh ................. H04L 12/2812
707/705
2013/0227038 A1* 8/2013 Rich ................. H04L 29/06476
709/206

FOREIGN PATENT DOCUMENTS

CN 102761532 A 10/2012
CN 103036929 A 4/2013
CN 104113770 A 10/2014

OTHER PUBLICATIONS

Second Notice issued by China State Intellectual Property Office, dated Feb. 4, 2017 for Chinese Patent Application No. 201510466511.7.

Chinese Patent Application No. 201510466511.7, Office Action dated Oct. 27, 2016.

* cited by examiner

MEDIA RESOURCE ADDRESS RESOLUTION AND ACQUISITION METHOD, SYSTEM, SERVER AND CLIENT TERMINAL

TECHNICAL FIELD

The present invention relates to the field of multimedia technologies, and more particularly to a media resource address resolution and acquisition method, a resolution system, a resolution server and a client terminal.

BACKGROUND

Video websites may usually take some protection measures on video addresses, not allowing the video addresses seen by other users. A resolution server of a third-party video player, by detecting webpage information of a video, can obtain a playback address of the video and return the playback address to a user. Then, the user can play back the video according to the playback address of the video.

However, for some situations listed in the following, for example, the address resolution method performed by the existing resolution server may not be useful, and it is difficult to obtain any available playback address through resolution.

1. A video website returns different playback addresses according to information of regions where requesters are located, while what a third-party video player detects is a playback address corresponding to a region where the third-party video player is located, and if the third-party video player and a user are located in different regions, the playback address detected by the third-party video player is unavailable for the user.

2. The video website restricts request frequencies of the requesters, and if access of the third-party video player is restricted due to a too high request frequency, webpage information of a video cannot be obtained, and no available playback address can be obtained through resolution.

3. The video website restricts the number of times of playback of a playback address, and after the number of times of playback of the playback address of a video obtained by the third-party video player through resolution reaches that restricted by the video website, no available playback address can be provided for the user.

Therefore, a solution that can improve the address resolution success rate of a resolution server is required.

SUMMARY

Embodiments of the present disclosure provides a media resource address resolution method, a media resource address acquisition method, a resolution server, a client terminal and a system, which can improve the success rate of address resolution of the resolution server.

According to a first aspect of the present disclosure, a media resource address resolution method may include: sending an assist resolution request to a client terminal, the assist resolution request carrying reference address information of a media resource on a target website, for directing the client terminal to acquire webpage information of the media resource from the target website according to the reference address information; and receiving the webpage information of the media resource returned by the client terminal, and resolving the webpage information of the media resource to obtain a playback address of the media resource.

The client terminal can assist in acquiring webpage information of a media resource required by address resolution, which can improve the success rate of address resolution of the resolution server.

According to some embodiments, the media resource address resolution method may further include: in response to a playback request of a media resource sent by the client terminal, judging whether it is necessary for the client terminal to assist in address resolution on the media resource requested to be played back by the client terminal, wherein, in response to a judgment result that it is necessary for the client terminal to assist in address resolution on the media resource requested to be played back by the client terminal, the assist resolution request is sent to the client terminal.

An assist resolution manner of the client terminal may be selected according to resolution requirements, which can make full use of the resolution capability of the resolution server and can also improve the success rate of address resolution.

The step of judging whether it is necessary for the client terminal to assist in address resolution on the media resource requested to be played back by the client terminal may include: attempting to perform address resolution on the media resource; and determining that it is necessary for the client terminal to assist in the address resolution upon failure of obtaining an expected result, e.g., a playback address of the media resource from the attempted address resolution.

By setting that an assist resolution manner of the client terminal is selected when the resolution server cannot obtain a desired result through resolution on its own, the resolution capability of the resolution server can be fully used and the success rate of the address resolution can also be improved.

Failure to obtain a playback address of the media resource from the address resolution may include the following situation: it is impossible to obtain any playback address available for the client terminal through address resolution because the target website returns different playback addresses of the media resource according to regional information of requesters. A playback address in line with the regional information of the client terminal can be obtained through address resolution by use of the method according to the embodiments of the present disclosure; accordingly, when a website takes a protective measure of returning different playback addresses according to regions of requesters, it is still possible to obtain a playback address available for a user through address resolution.

Failure to obtain an expected result from the address resolution may include the following situation: it is impossible to obtain any playback address available for the client terminal through address resolution because access to the target website is restricted due to a too high frequency of access to the target website. As the client terminal may usually not go beyond the restriction to the frequency of access, in the present invention, in a manner of relying on the client terminal to assist in resolution, when a website takes a protective measure of restricting the frequency of access, it is still possible to obtain a playback address available for a user through address resolution.

Failure to obtain an expected result from the address resolution may include the following situation: it is impossible to obtain any playback address available for the client terminal through address resolution because of restrictions to the number of times of playback of the playback address. As the client terminal may usually not go beyond the restriction to the number of times of playback, in the embodiments of the present disclosure, in a manner of relying on the client terminal to assist in resolution, when a website takes a protective measure of restricting the number of times of playback, it is still possible to obtain a playback address available for a user through resolution.

The media resource address resolution method may further include: receiving a playback request of a media resource sent by the client terminal; and sending a playback address of the media resource to the client terminal, in order that the client terminal plays back the media resource according to the playback address of the media resource.

The resolution server returns a playback address obtained through assist resolution by using the capability of the client terminal to the client terminal for playback, which can improve the success rate of playback.

The embodiments of the present disclosure further provides a media resource address acquisition method, including: responding, by a client terminal, to an assist resolution request sent by a resolution server, the assist resolution request carrying reference address information of a media resource on a target website, acquiring webpage information of the media resource from the target website according to the reference address information, and returning the webpage information to the resolution server for resolution; and receiving, by the client terminal, a playback address of the media resource obtained, through resolution, and returned by the resolution server.

The client terminal assists the resolution server in acquiring webpage information of a media resource required by address resolution, which can improve the success rate of address resolution.

The media resource address acquisition method may further include: sending, by the client terminal, a playback request of the media resource to the resolution server, wherein the assist resolution request is sent by the resolution server in response to the playback request; and playing back, by the client terminal, the media resource according to the playback address of the media resource upon receipt of the playback address of the media resource.

The client terminal plays back the media resource according to the playback address obtained through assist resolution by using its own capability, which can improve the success rate of playback.

According to another aspect of the present disclosure, a resolution server used for media resource address resolution is provided, which includes: a directing unit, used for sending an assist resolution request to a client terminal, the assist resolution request carrying reference address information of a media resource on a target website, for directing the client terminal to acquire webpage information of the media resource from the target website according to the reference address information and return the webpage information; and a resolution unit, for receiving the webpage information of the media resource returned by the client terminal, and resolving the webpage information of the media resource to obtain a playback address of the media resource.

The resolution server may further include: a judgment unit, for, in response to a playback request of a media resource sent by the client terminal, judging whether it is necessary for the client terminal to assist in address resolution on the media resource requested to be played back by the client terminal, wherein, in response to a judgment result that it is necessary for the client terminal to assist in address resolution on the media resource requested to be played back by the client terminal, the directing unit sends the assist resolution request to the client terminal.

The judgment unit attempts to perform address resolution on the media resource in response to the playback request of the media resource sent by the client terminal, and determines that it is necessary for the client terminal to assist in the address resolution upon failure of obtaining an expected result, e.g., a playback address of the media resource from the attempted address resolution.

Failure to obtain an expected result from the address resolution in the judgment unit includes the following situations:

(1) it is impossible to obtain any playback address available for the client terminal through resolution because the target website returns different playback addresses of the media resource according to regional information of requesters; or (2) it is impossible to obtain any playback address available for the client terminal through resolution because access to the target website is restricted due to a too high frequency of access to the target website; or (3) it is impossible to obtain any playback address available for the client terminal through resolution because of restrictions to the number of times of playback of the playback address.

The resolution server may further include: a receiving unit for receiving a playback request of a media resource sent by the client terminal; and a sending unit, for sending a playback address of the media resource to the client terminal, in order that the client terminal plays back the media resource according to the playback address of the media resource.

According to a further aspect of the present disclosure, a client terminal is provided, which includes: an assist resolution unit, for, responding to an assist resolution request sent by a resolution server, the assist resolution request carrying reference address information of a media resource on a target website, acquiring webpage information of the media resource from the target website according to the reference address information, and returning the webpage information to the resolution server for resolution; and an acquisition unit, for receiving a playback address of the media resource obtained, through resolution, and returned by the resolution server.

Preferably, the client terminal may further include: a request unit, for sending a playback request of the media resource to the resolution server; and a playback unit, for playing back the media resource according to the playback address of the media resource received by the acquisition unit.

According to another aspect of the present invention, a media resource address resolution system is provided, which includes the resolution server and the client terminal described above.

According to a further aspect of the present disclosure, a media resource address resolution system is provided, which includes a resolution server and a client terminal, wherein the resolution server sends an assist resolution request to the client terminal, the assist resolution request carrying reference address information of a media resource on a target website; the client terminal, in response to the assist resolution request, acquires webpage information of the media resource from the target website according to the reference address information, and returns the webpage information to the resolution server; the resolution server receives the webpage information of the media resource returned by the client terminal, and resolves the webpage information of the media resource to obtain a playback address of the media resource; and the resolution server sends the playback address of the media resource to the client terminal, in order that the client terminal plays back the media resource according to the playback address of the media resource.

The client terminal may further send a playback request of the media resource to the resolution server, the resolution server, in response to the playback request, judges whether it is necessary for the client terminal to assist in address resolution on the media resource requested to be played back by the client terminal, and the resolution server, in response to a judgment result that it is necessary for the client terminal to assist in address resolution on the media resource requested to be played back by the client terminal, sends the assist resolution request to the client terminal.

As stated above, the client terminal can assist in acquiring webpage information of a media resource required by address resolution, which can improve the success rate of address resolution of the resolution server.

The present disclosure further provides a computer system (e.g., a server) including a processor and a memory device coupled to the processor. The memory device stores instructions, when executed by the processor, cause the computer system to perform:

sending an assist resolution request to a client terminal, the assist resolution request carrying reference address information of a media resource on a target website for directing the client terminal to acquire webpage information of the media resource from the target website according to the reference address information; and receiving the webpage information of the media resource returned by the client terminal, and resolving the webpage information of the media resource to obtain a playback address of the media resource.

The present disclosure also provides a client terminal including a processor and a memory device coupled to the processor. The memory device stores instructions, when executed by the processor, cause the client terminal to perform:

responding, by the client terminal, to an assist resolution request sent by a resolution server, the assist resolution request carrying reference address information of a media resource on a target website, acquiring webpage information of the media resource from the target website according to the reference address information, and returning the webpage information to the resolution server for resolution; and receiving, by the client terminal, a playback address of the media resource obtained, through address resolution, and returned by the resolution server.

BRIEF DESCRIPTION OF THE DRAWINGS

The foregoing and other objectives, features and advantages of the disclosure will become more evident by describing exemplary implementation modes of the disclosure in more detail in combination with the accompanying drawings, wherein, in the exemplary implementation modes of the disclosure, the same reference number generally represents the same component.

DETAILED DESCRIPTION

Preferred implementation modes of the disclosure will be described below in more detail with reference to the accompanying drawings. Although the preferred implementation modes of the disclosure are shown in the accompanying drawings, it should be understood that the disclosure can be implemented in various forms but should not be limited by the implementation modes stated herein. On the contrary, providing the implementation modes is intended to make the disclosure more thorough and complete and enable the scope of the disclosure to be completely conveyed to persons skilled in the art.

Figure 5:
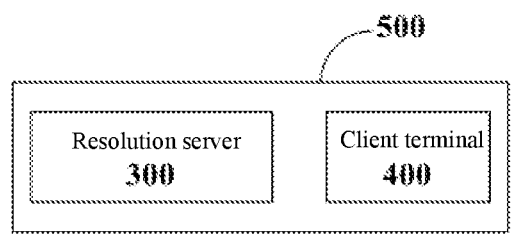
FIG. 5 is a schematic structural diagram of one embodiment of a media resource address resolution system according to the present disclosure.

FIG. 5 schematically illustrates a media resource address resolution system 500 according to one embodiment of the present disclosure.

As shown in FIG. 5, the media resource address resolution system 500 includes a resolution server 300 and a client terminal 400. The resolution server 300 can improve the address resolution success rate of the resolution server with the assistance of the client terminal 400.

In the following, a media resource address resolution method according to one embodiment of the present disclosure is described with reference to FIG. 1.

Figure 1:
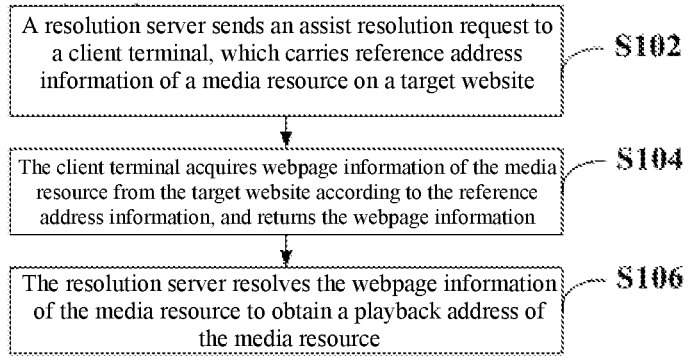
FIG. 1 is a flow chart of one embodiment of a media resource address resolution method according to the present disclosure.

FIG. 1 is a flow chart of one embodiment of a media resource address resolution method according to one embodiment of the present disclosure.

As shown in FIG. 1, in step S102, a resolution server 300 sends an assist resolution request to a client terminal 400. The assist resolution request may carry reference address information of a media resource on a target website and can be used for directing the client terminal 400 to acquire webpage information of the media resource from the target website according to the reference address information and returning the webpage information.

The resolution server 300, for example, may be a third-party media playback server of a non-target website. A media resource requested by the client terminal 400 is on a target website. The media resource, for example, may be a video resource, an audio resource or the like, but is not limited to the examples.

In step S104, the client terminal 400 responds to the assist resolution request sent by the resolution server 300, acquires webpage information of the media resource from the target website according to the reference address information, and returns the webpage information to the resolution server 300 for resolution.

In step S106, the resolution server 300 receives the webpage information of the media resource returned by the client terminal 400, and resolves the webpage information of the media resource to obtain a playback address of the media resource. Reference can be made to the existing address resolution method that the resolution server 300 may use resolve the webpage information of the media resource to obtain a playback address of the media resource. For example, the playback address of the media resource is deduced through a decompilation technology such as viewing a page source code.

Information exchange in the media resource address resolution method according to the present invention can be achieved by adopting HTTP (Hypertext Transfer Protocol), and corresponding request messages and response messages may be in line with format requirements of the HTTP.

The resolution server 300 relies on the client terminal 400 to assist in acquiring webpage information of the media resource required for address resolution, and performs the address resolution, which can improve the address resolution success rate of the resolution server 300.

The resolution server 300 may request the client terminal 400 to assist in the case of failing to obtain the playback address of the media resource through resolution on its own after receiving a playback request from the client terminal 400.

In addition, the resolution server 300 may also request a proper client terminal 400 to assist in the case of not receiving a playback request from the client terminal 400 but for another reason, for example, when collecting a playback address of a related media resource and finding that it is difficult to obtain the playback address of the media resource through resolution on its own.

In the following, the situation where the resolution server 300, after receiving the playback request from the client terminal 400 but failing to obtain the playback address of the media resource through resolution on its own, requests the client terminal 400 to assist is described with reference to FIG. 2.

Figure 2:
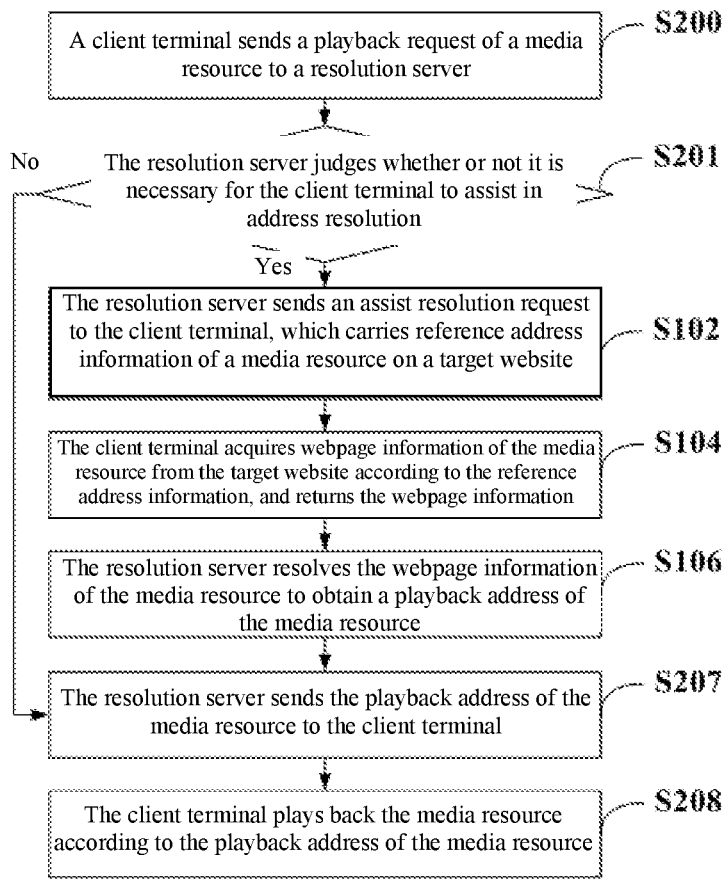
FIG. 2 is a flow chart of another embodiment of the media resource address resolution method according to the present disclosure.

FIG. 2 is a flow chart of another embodiment of the media resource address resolution method according to the present disclosure.

As shown in FIG. 2, in step S200, a client terminal 400 sends a playback request of a media resource to a resolution server 300. Correspondingly, the resolution server 300 may receive the playback request of the media resource sent by the client terminal 400.

In step S201, the resolution server 300, in response to the playback request of the media resource sent by the client terminal 400, judges whether or not it is necessary for the client terminal 400 to assist in address resolution on the media resource requested to be played back by the client terminal 400.

In response to a judgment result that it is necessary for the client terminal 400 to assist in address resolution on the media resource requested to be played back by the client terminal 400, step S102 is performed to send an assist resolution request to the client terminal 400.

In response to a judgment result that it is not necessary for the client terminal 400 to assist in address resolution on the media resource requested to be played back by the client terminal 400, it indicates that the resolution server 300 can obtain an available playback address of the media resource through resolution on its own, and step S207 is performed to send the playback address of the media resource to the client terminal 400.

In step S102, the resolution server 300 sends an assist resolution request to the client terminal 400, the assist resolution request carrying reference address information of a media resource on a target website, which can be used for directing the client terminal 400 to acquire webpage information of the media resource from the target website according to the reference address information and returning the webpage information.

In step S104, the client terminal 400 responds to the assist resolution request sent by the resolution server 300, acquires webpage information of the media resource from the target website according to the reference address information, and returns the webpage information to the resolution server 300 for resolution.

In step S106, the resolution server 300 receives the webpage information of the media resource returned by the client terminal 400, and resolves the webpage information of the media resource to obtain a playback address of the media resource.

In step S207, the resolution server 300 sends the playback address of the media resource to the client terminal 400.

In step S208, the client terminal 400 plays back the media resource according to the playback address of the media resource upon receipt of the playback address of the media resource.

The resolution server 300 selects an assist resolution manner of the client terminal 400 according to resolution requirements, which can make full use of the resolution capability of the resolution server 300 and can also improve the success rate of address resolution.

One exemplary judgment method in which the resolution server 300 judges whether or not it is necessary for the client terminal 400 to assist in address resolution in step S201 is as follows:

attempting, by the resolution server 300, to perform address resolution on the media resource; if an expected result fails to be obtained from the address resolution, determining that it is necessary for the client terminal 400 to assist in the address resolution; on the contrary, if the resolution server 300 can obtain an expected result through resolution on its own, that is, an available playback address of the media resource has been obtained, determining that it is not necessary for the client terminal 400 to assist in the address resolution.

In some embodiments, failure to obtain an expected result from the address resolution may include the following situations:

(1). It is impossible to obtain any playback address available for the client terminal 400 through resolution because the target website returns different playback addresses of the media resource according to regional information of requesters.

(2). It is impossible to obtain any playback address available for the client terminal 400 through resolution because access to the target website is restricted due to a too high frequency of access to the target website.

(3). It is impossible to obtain any playback address available for the client terminal 400 through resolution because of restrictions to the number of times of playback of the playback address.

With respect to the above three typical scenarios, the media resource address resolution process is described respectively.

Scenario 1

The resolution server 300 finds that it is impossible to obtain any playback address available for the client terminal 400 through resolution because the target website returns different playback addresses of the media resource according to regional information of requesters, and sends an assist resolution request to the client terminal 400, wherein reference address information of the media resource on a target website is carried; the client terminal 400, as directed, sends a request for acquiring the media resource to the target website according to the reference address information; the target website assigns a playback address according to regional information of the client terminal 400, and returns the playback address to the client terminal 400 through webpage information of the media resource; the client terminal 400 sends the webpage information of the media resource to the resolution server 300 for resolution, and the resolution server 300 obtains the playback address from resolution of the webpage information, and returns the playback address to the client terminal 400; and the client terminal 400 can play back the media resource according to the playback address.

It is thus clear that a playback address in line with the regional information of the client terminal 400 can be obtained through resolution by use of the method according to the present invention; accordingly, when a website takes a protective measure of returning different playback addresses according to regions of requesters, it is still possible to obtain a playback address available for a user through resolution.

Scenario 2

The resolution server 300 finds that it is impossible to obtain any playback address available for the client terminal 400 through resolution because access to the target website is restricted due to a too high frequency of access to the target website, and sends an assist resolution request to the client terminal 400, wherein reference address information of the media resource on the target website is carried; the client terminal 400, as directed, sends a request for acquiring the media resource to the target website according to the reference address information; the target website detects an IP address of the client terminal 400 and judges whether or not a frequency of access from the IP address meets the requirement, if the frequency meets the requirement, assigns a playback address to the client terminal 400, and returns the playback address to the client terminal 400 through webpage information of the media resource; the client terminal 400 sends the webpage information of the media resource to the resolution server 300 for resolution, and the resolution server 300 obtains the playback address from resolution of the webpage information, and returns the playback address to the client terminal 400; and the client terminal 400 can play back the media resource according to the playback address.

As the client terminal 400 may usually not go beyond the restriction to the frequency of access, in the present invention, in a manner of relying on the client terminal 400 to assist in resolution, when a website takes a protective measure of restricting the frequency of access, it is still possible to obtain a playback address available for a user through resolution.

Scenario 3

The resolution server 300 finds that it is impossible to obtain any playback address available for the client terminal 400 through resolution because of restrictions to the number of times of playback of the playback address, and sends an assist resolution request to the client terminal 400, which carries reference address information of the media resource on a target website; the client terminal 400, as directed, sends a request for acquiring the media resource to the target website according to the reference address information; the target website, according to different requesters, assigns a new playback address to the client terminal 400, and returns the new playback address to the client terminal 400 through webpage information of the media resource; the client terminal 400 sends the webpage information of the media resource to the resolution server 300 for resolution, and the resolution server 300 obtains the new playback address from the webpage information through resolution, and returns the new playback address to the client terminal 400; and the client terminal 400 can play back the media resource according to the new playback address.

As the client terminal 400 may usually not go beyond the restriction to the number of times of playback, in some embodiments of the present disclosure, in a manner of relying on the client terminal 400 to assist in resolution, when a website takes a protective measure of restricting the number of times of playback, it is still possible to obtain a playback address available for a user through resolution.

In the following, a resolution server used for media resource address resolution according to one embodiment of the present invention is described with reference to FIG. 3A.

Figure 3A:
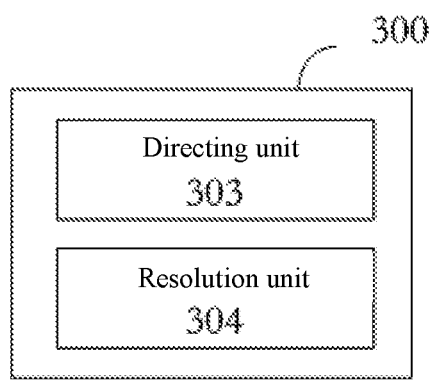
FIG. 3A is a schematic structural diagram of one embodiment of a resolution server according to the present disclosure.

FIG. 3A is a schematic structural diagram of a resolution server used for media resource address resolution according to one embodiment of the present disclosure.

As shown in FIG. 3A, a resolution server 300 includes a directing unit 303 and a resolution unit 304. The directing unit 303 sends an assist resolution request to a client terminal, the assist resolution request carrying reference address information of a media resource on a target website, which can be used for directing the client terminal to acquire webpage information of the media resource from the target website according to the reference address information and return the webpage information.

The resolution unit 304 receives the webpage information of the media resource returned by the client terminal, and resolves the webpage information of the media resource to obtain a playback address of the media resource.

The resolution server relies on the client terminal to assist in acquiring webpage information of the media resource required for address resolution, which can improve the address resolution success rate of the resolution server.

The resolution server 300 may request the client terminal to assist in the case of failing to obtain the playback address of the media resource through resolution on its own after receiving a playback request from the client terminal.

The resolution server may also request the proper client terminal to assist in the case of not receiving a playback request from the client terminal but for another reason, for example, when collecting a playback address of a related media resource and finding that it is difficult to obtain the playback address of the media resource through resolution on its own.

In the following, a resolution server used for media resource address resolution according to another embodiment of the present invention is described with reference to FIG. 3B, wherein the resolution server 300 requests the client terminal to assist in the case of failing to obtain the playback address of the media resource through resolution on its own after receiving a playback request from the client terminal.

Figure 3B:
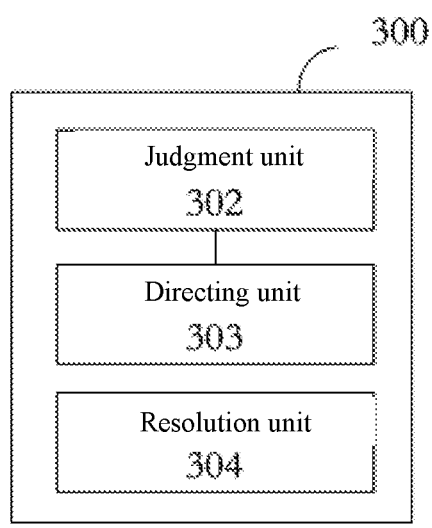
FIG. 3B is a schematic structural diagram of another embodiment of the resolution server according to the present disclosure.

FIG. 3B is a schematic structural diagram of another embodiment of the resolution server according to the present invention.

As shown in FIG. 3B, in addition to the directing unit 303 and the resolution unit 304 illustrated in FIG. 3A, the resolution server 300 may further include a judgment unit 302. The judgment unit 302, in response to a playback request of a media resource sent by the client terminal, judges whether or not it is necessary for the client terminal to assist in address resolution on the media resource requested to be played back by the client terminal.

In response to a judgment result that it is necessary for the client terminal to assist in address resolution on the media resource requested to be played back by the client terminal, the directing unit 303 sends the assist resolution request to the client terminal.

An assist resolution manner of the client terminal is flexibly selected according to resolution requirements, which can make full use of the resolution capability of the resolution server and can also improve the success rate of address resolution.

The judgment unit 302 may, in response to a playback request of a media resource sent by the client terminal, judge whether or not it is necessary for the client terminal to assist by attempting to perform address resolution on the media resource. If an expected result fails to be obtained by attempting to perform address resolution, or in other words, the resolution is not successful and a desired media resource address is not obtained through resolution, it is determined that it is necessary for the client terminal to assist in the address resolution.

If the resolution server has obtained an expected result by attempting to perform address resolution on its own, or in other words, the resolution is successful and a desired media resource address is obtained, it is not necessary for the client terminal to assist.

By setting that an assist resolution manner of the client terminal is selected when the resolution server cannot obtain a desired result through resolution on its own, the resolution capability of the resolution server can be fully used and the success rate of the address resolution can also be improved.

Failure to obtain an expected result from the address resolution in the judgment unit 302 may include the following situations:

(1) it is impossible to obtain any playback address available for the client terminal through resolution because the target website returns different playback addresses of the media resource according to regional information of requesters; or (2) it is impossible to obtain any playback address available for the client terminal through resolution because access to the target website is restricted due to a too high frequency of access to the target website; or (3) it is impossible to obtain any playback address available for the client terminal through resolution because of restrictions to the number of times of playback of the playback address.

In the following, a resolution server used for media resource address resolution according to a further embodiment of the present invention is described with reference to FIG. 3C.

Figure 3C:
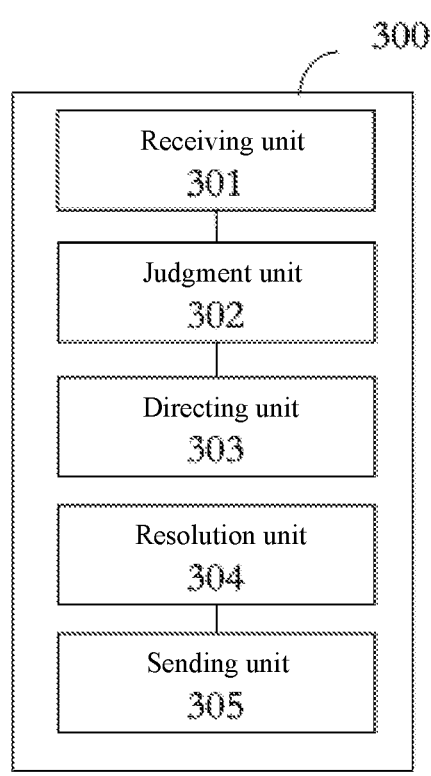
FIG. 3C is a schematic structural diagram of a further embodiment of the resolution server according to the present disclosure.

FIG. 3C is a schematic structural diagram of a further embodiment of the resolution server according to the present invention.

As shown in FIG. 3C, in addition to the judgment unit 302, the directing unit 303 and the resolution unit 304 illustrated in FIG. 3B, the resolution server 300 may further include: a receiving unit 301 and a sending unit 305. The receiving unit 301 receives a playback request of a media resource sent by the client terminal. The sending unit 305 sends a playback address of the media resource to the client terminal, in order that the client terminal plays back the media resource according to the playback address of the media resource.

Figure 4A:
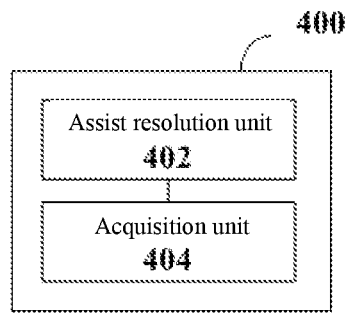
FIG. 4A is a schematic structural diagram of one embodiment of a client terminal according to the present disclosure.

In the following, a client terminal according to one embodiment of the present invention is described with reference to FIG. 4A. FIG. 4A is a schematic structural diagram of one embodiment of a client terminal according to the present invention. As shown in FIG. 4A, the client terminal 400 includes an assist resolution unit 402 and an acquisition unit 404.

The assist resolution unit 402 responds to an assist resolution request sent by a resolution server, the assist resolution request carrying reference address information of a media resource on a target website, acquires webpage information of the media resource from the target website according to the reference address information, and returns the webpage information to the resolution server for resolution. The acquisition unit 404 receives a playback address of the media resource obtained, through resolution, and returned by the resolution server.

The client terminal assists the resolution server in acquiring webpage information of a media resource required for address resolution, which can improve the address solution success rate of the resolution server.

Figure 4B:
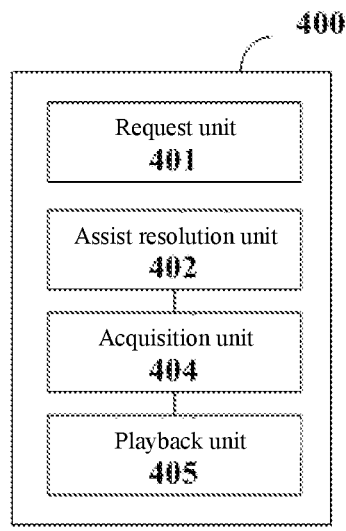
FIG. 4B is a schematic structural diagram of another embodiment of the client terminal according to the present disclosure.

In the following, a client terminal according to another embodiment of the present invention is described with reference to FIG. 4B. FIG. 4B is a schematic structural diagram of another embodiment of the client terminal according to the present invention. As shown in FIG. 4B, in addition to the assist resolution unit 402 and the acquisition unit 404 illustrated in FIG. 4A, the client terminal 400 may further include a request unit 401 and a playback unit 405.

The request unit 401 sends a playback request of a media resource to the resolution server. The playback unit 405 plays back the media resource according to the playback address of the media resource received by the acquisition unit.

The client terminal plays back the media resource according to the playback address obtained through assist resolution by using its own capability, which can improve the success rate of the playback.

In the following, a media resource address resolution system according to one embodiment of the present invention is described on the whole with reference to FIG. 5. FIG. 5 is a schematic structural diagram of one embodiment of a media resource address resolution system according to the present invention. As shown in FIG. 5, the media resource address resolution system 500 includes a resolution server 300 and a client terminal 400.

The resolution server 300 may be the resolution server 300 as shown in FIG. 3A, 3B or 3C, and may also be implemented in other manners. The client terminal 400 may be the client terminal 400 as shown in FIG. 4A or 4B, and may also be implemented in other manners.

The resolution server 300 sends an assist resolution request to the client terminal 400, the assist resolution request carrying reference address information of a media resource on a target website. The client terminal 400 responds to the assist resolution request, acquires webpage information of the media resource from the target website according to the reference address information, and returns the webpage information to the resolution server 300. The resolution server 300 receives the webpage information of the media resource returned by the client terminal 400, and resolves the webpage information of the media resource to obtain a playback address of the media resource. The resolution server 300 sends the playback address of the media resource to the client terminal 400, in order that the client terminal 400 plays back the media resource according to the playback address of the media resource.

The resolution server 300 may request the client terminal to assist in the case of failing to obtain the playback address of the media resource through resolution on its own after receiving a playback request from the client terminal. In this case, the client terminal 400 may send a playback request of the media resource to the resolution server 300. The resolution server 300, in response to the playback request, judges whether or not it is necessary for the client terminal 400 to assist in address resolution on the media resource requested to be played back by the client terminal 400. In response to a judgment result that it is necessary for the client terminal 400 to assist in address resolution on the media resource requested to be played back by the client terminal 400, the resolution server 300 sends the assist resolution request to the client terminal 400.

The resolution server may also request the proper client terminal to assist in the case of not receiving a playback request from the client terminal but for another reason, for example, when collecting a playback address of a related media resource and finding that it is difficult to obtain the playback address of the media resource through resolution on its own.

In addition, the method according to the embodiments of the present disclosure may also be implemented as a computer program product which includes a computer-readable storage medium, and a computer program used for executing the functions defined in the method of the present invention is stored on the computer-readable storage medium. Persons skilled in the art may further understand that various exemplary logic blocks, modules, circuits and algorithm steps described in combination with the disclosure herein can be implemented as electronic hardware, computer software or a combination thereof.

Flow charts and block diagrams in the accompanying drawings show architectures, functions and operations possibly achieved according to the systems and methods according to multiple embodiments of the present invention. In this regard, each block in the flow charts or block diagrams can represent one module or a part of a program segment or code, and the module or the part of the program segment or code includes one or more executable instructions used for implementing prescribed logical functions. It should also be noted that, in some implementations as alternatives, the functions labeled in the blocks may also occur in an order different from that labeled in the accompanying drawings. For example, actually, two consecutive blocks can be basically executed concurrently, and they may also be executed in a reverse order sometimes, which is determined according to the functions involved. It should also be noted that each block in the block diagrams and/or the flow charts and a combination of the blocks in the block diagrams and/or the flow charts may be achieved with a specific hardware-based system that executes prescribed functions or operations, or may be achieved with a combination of specific hardware and computer instructions.

As will be understood by those skilled in the art, embodiments of the present disclosure may be embodied as a method, a system or a computer program product. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

A person having ordinary skill in the art should understand that the embodiments of the present disclosure described above are exemplary but exhaustive. The present invention is not limited to the embodiments disclosed.

Without departing from the scope and spirit of the embodiments described, lots of modifications and variations are obvious for persons of ordinary skill in the art. The selection of the terms used herein is aimed to best explain each embodiment's principle, actual application or improvements to technologies in the market, or enable other persons of ordinary skill in the art to understand each embodiment disclosed herein.

The invention claimed is:

1. A media resource address resolution method, comprising:
   sending an assist resolution request from a resolution server provided separately from a server hosting a target website to a client terminal, the assist resolution request including reference address information of a media resource on the target website and causing the client terminal to acquire webpage information of the media resource from the server hosting the target website according to the reference address information; and
   receiving, by the resolution server, the webpage information of the media resource returned by the client terminal; and
   resolving, at the resolution server, the received webpage information of the media resource to obtain a playback address of the media resource.

2. The method according to claim 1, further comprising:
   before sending the assist resolution request from the resolution server to the client terminal, in response to a playback request of the media resource sent by the client terminal, judging, at the resolution server, whether it is necessary for the client terminal to assist in address resolution on the media resource requested to be played back by the client terminal,
   wherein, in response to a judgment result that it is necessary for the client terminal to assist in address resolution on the media resource requested to be played back by the client terminal, the assist resolution request is sent from the resolution server to the client terminal.

3. The method according to claim 2, wherein the judging whether it is necessary for the client terminal to assist in address resolution on the media resource requested to be played back by the client terminal comprises:
   attempting to perform address resolution on the media resource by the resolution server; and
   determining, by the resolution server, that it is necessary for the client terminal to assist in the address resolution upon failure of obtaining the playback address of the media resource from the attempted address resolution.

4. The method according to claim 3, wherein the failure of obtaining the playback address of the media resource from the address resolution comprises the following situations:
   it is impossible to obtain any playback address available for the client terminal through address resolution because the target website returns different playback addresses of the media resource according to regional information of requesters;
   it is impossible to obtain any playback address available for the client terminal through address resolution because access to the target website is restricted due to a too high frequency of access to the target website; or
   it is impossible to obtain any playback address available for the client terminal through address resolution because of restrictions to the number of times of playback of the playback address.

5. The method according to claim 1, further comprising:
   receiving, by the resolution server, a playback request of the media resource sent by the client terminal; and
   sending the playback address of the media resource from the resolution server to the client terminal, such that the client terminal plays back the media resource according to the playback address of the media resource.

6. The method according to claim 1, wherein the resolution server comprises a third-party media playback server of a non-target website.

7. A media resource address acquisition method, comprising:
   receiving, by a client terminal, an assist resolution request sent by a resolution server provided separately from a server hosting a target website, the assist resolution request including reference address information of a media resource on the target website;
   upon receiving the assist resolution request, acquiring webpage information of the media resource from the server hosting the target web site according to the reference address information;
   returning the acquired webpage information to the resolution server for address resolution based on the webpage information; and
   receiving, by the client terminal, a playback address of the media resource obtained through the address resolution and returned by the resolution server.

8. The method according to claim 7, further comprising:
   sending a playback request of the media resource from the client terminal to the resolution server, wherein the assist resolution request is sent by the resolution server in response to the playback request; and
   playing back, by the client terminal, the media resource according to the playback address of the media resource upon receipt of the playback address of the media resource.

9. The method according to claim 7, wherein the resolution server comprises a third-party media playback server of a non-target website.

10. A resolution server used for media resource address resolution and provided separately from a server hosting a webpage, comprising:
    one or more processors; and
    memory storing instructions, when executed by the one or more processors, configured to cause the one or more processors to:
      send an assist resolution request to a client terminal, the assist resolution request including reference address information of a media resource on a target website and causing the client terminal to acquire webpage information of the media resource from the server hosting the target website according to the reference address information and return the webpage information; and
      receive the webpage information of the media resource returned by the client terminal; and
      resolve the received webpage information of the media resource to obtain a playback address of the media resource.

11. The resolution server according to claim 10, wherein the instructions are further configured to cause the one or more processors to:
    judge whether it is necessary for the client terminal to assist in address resolution on the media resource requested to be played back by the client terminal, in response to a playback request of the media resource sent by the client terminal, and send the assist resolution request to the client terminal, in response to a judgment result that it is necessary for the client terminal to assist in address resolution on the media resource requested to be played back by the client terminal.

12. The resolution server according to claim 11, wherein the instructions are further configured to cause the one or more processors to attempt to perform address resolution on the media resource in response to the playback request of the media resource sent by the client terminal, and determine that it is necessary for the client terminal to assist in the address resolution upon failure of obtaining the media resource from the attempted address resolution.

13. The resolution server according to claim 10, wherein the instructions are further configured to cause the one or more processors to:

receive a playback request of the media resource sent by the client terminal; and send the playback address of the media resource to the client terminal, such that the client terminal plays back the media resource according to the playback address of the media resource.

14. The resolution server according to claim 10, wherein the resolution server comprises a third-party media playback server of a non-target website.

15. A client terminal, comprising:

one or more processors; and memory storing instructions, when executed by the one or more processors, configured to cause the one or more processors to:

receive an assist resolution request sent by a resolution server provided separately from a server hosting a target website, the assist resolution request including reference address information of a media resource on the target website;

upon receiving the assist resolution request, acquire webpage information of the media resource from the target website according to the reference address information;

return the acquired webpage information to the resolution server for address resolution based on the webpage information; and receive a playback address of the media resource obtained through the address resolution and returned by the resolution server.

16. The client terminal according to claim 15, wherein the instructions are further configured to cause the one or more processors to:

send a playback request of the media resource to the resolution server; and play back the media resource according to the playback address of the media resource received from the resolution server.

17. The client terminal according to claim 15, wherein the resolution server comprises a third-party media playback server of a non-target website.

* * * * *